(12) United States Patent
Shu et al.

(10) Patent No.: US 12,719,303 B2
(45) Date of Patent: Aug. 25, 2026

(54) CONTROL METHOD FOR UNINTERRUPTIBLE POWER SUPPLY SYSTEM, CONTROLLER, AND UNINTERRUPTIBLE POWER SUPPLY SYSTEM

(71) Applicant: HUAWEI DIGITAL POWER TECHNOLOGIES CO., LTD., Shenzhen (CN)

(72) Inventors: Zhou Shu, Dongguan (CN); Xiangbiao Peng, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 51 days.

(21) Appl. No.: 18/489,810

(22) Filed: Oct. 18, 2023

(65) Prior Publication Data

US 2024/0136849 A1 Apr. 25, 2024
US 2024/0235250 A9 Jul. 11, 2024

(30) Foreign Application Priority Data

Oct. 20, 2022 (CN) ........................ 202211288133.4

(51) Int. Cl.
*H02J 9/06* (2006.01)

(52) U.S. Cl.
CPC .................................. *H02J 9/062* (2013.01)

(58) Field of Classification Search
CPC . H02J 9/062; H02J 9/063; H02J 9/068; Y02E 40/30; Y02E 40/40
See application file for complete search history.

(56) References Cited

U.S. PATENT DOCUMENTS

2012/0181871 A1* 7/2012 Johansen ................ H02J 9/062 307/66
2015/0340864 A1* 11/2015 Compton .................. H02J 3/00 307/66

(Continued)

FOREIGN PATENT DOCUMENTS

CN 203504513 U 3/2014
CN 107196631 B 3/2021

(Continued)

OTHER PUBLICATIONS

Extended European Search Report in European Appln No. 23204505.4, dated Mar. 27, 2024, 11 pages.

*Primary Examiner* — Rexford N Barnie
*Assistant Examiner* — Thai H Tran
(74) *Attorney, Agent, or Firm* — Fish & Richardson P.C.

(57) ABSTRACT

Example control methods and apparatus are described. An example control method for an uninterruptible power supply system includes: when a bypass power supply branch supplies power to a load, outputting a first drive signal to a first switch device and outputting a second drive signal to a second switch device; and controlling the first drive signal and the second drive signal to have a phase difference with an input voltage of the bypass power supply branch; or when a load current of the bypass power supply branch is less than a first threshold, outputting an inverter control signal to control an inverter power supply branch to charge an energy storage battery; or when a current of the inverter power supply branch flows back to an input end of the bypass power supply branch, turning off the first switch device and the second switch device via the inverter power supply branch.

20 Claims, 9 Drawing Sheets

(56) References Cited

U.S. PATENT DOCUMENTS

| | | | | |
|---|---|---|---|---|
| 2018/0316216 | A1 | 11/2018 | Masunaga et al. | |
| 2021/0044109 | A1* | 2/2021 | Spiecker | H02J 3/007 |
| 2022/0224149 | A1 | 7/2022 | Colombi et al. | |

FOREIGN PATENT DOCUMENTS

| | | | |
|---|---|---|---|
| CN | 107196630 | B | 4/2021 |
| EP | 3622611 | B1 | 2/2021 |
| GB | 2562221 | A | 11/2018 |
| WO | 2018206293 | A1 | 11/2018 |

* cited by examiner

CONTROL METHOD FOR UNINTERRUPTIBLE POWER SUPPLY SYSTEM, CONTROLLER, AND UNINTERRUPTIBLE POWER SUPPLY SYSTEM

CROSS-REFERENCE TO RELATED APPLICATIONS

This application claims priority to Chinese Patent Application No. 202211288133.4, filed on Oct. 20, 2022, which is hereby incorporated by reference in its entirety.

TECHNICAL FIELD

This application relates to the field of electronic power technologies, and in particular, to a control method for an uninterruptible power supply system, a controller to which the control method for the uninterruptible power supply system is applied, and the uninterruptible power supply system including the controller.

BACKGROUND

An uninterruptible power supply (UPS) system is a system that can replace, when a power grid is faulty (for example, a power failure and undervoltage), the power grid to uninterruptedly supply power to a load and maintain a normal operation of the load. The UPS system mainly includes a UPS, a power grid, a load, and a battery pack. The UPS is separately connected to the power grid, the load, and the battery pack. The UPS may monitor a working status of the power grid. When the power grid is working appropriately, the UPS may use electrical energy provided by the power grid, to supply power to the load. When the power grid is faulty, the UPS may control the battery pack to be discharged, and use electrical energy output by the battery pack, to continue to supply power to the load.

An energy storage UPS is a UPS equipped with a large quantity of energy storage batteries. An economy control operation (ECO) mode is an operation mode of the energy storage UPS. When an input voltage and a frequency are within a power supply range allowed by the ECO mode, a bypass preferentially supplies power to the load (that is, the power grid supplies power). When the input voltage and the frequency are beyond the power supply range allowed by the ECO mode, the battery pack supplies power to the load. Time for switching between bypass power supply and battery pack power supply should be as short as possible to reduce impact on a back-end load. In the ECO mode, when the bypass power supply is switched to the battery pack power supply, energy backflow needs to be prevented, to supply power to another load in a front end of the bypass. This may cause an inverter in the UPS to be overloaded, and consequently cause an abnormal UPS output voltage.

In some technical solutions, a driving manner of the UPS is changed and an input power factor (PF) of the bypass is set close to 1, to resolve the foregoing problem of the abnormal UPS output voltage. However, in an actual working process, the input PF of the bypass may be low (not close to 1, for example, less than 0.8) due to reasons such as a load size, a percentage of an active current, and current detection precision. In this case, using a changed driving manner causes distortion of the UPS output voltage, and affects quality of a power supply voltage of the UPS.

SUMMARY

According to a first aspect, this application provides a control method for an uninterruptible power supply system, where the uninterruptible power supply system includes a bypass power supply branch, an inverter power supply branch, and an energy storage battery. The bypass power supply branch and the inverter power supply branch are connected in parallel and then are separately connected to a load. The energy storage battery is connected to the inverter power supply branch. The bypass power supply branch includes a first switch device and a second switch device that are connected in anti-parallel. The bypass power supply branch and the inverter power supply branch supply power to the load in a time-division manner. The control method for the uninterruptible power supply system includes: when the bypass power supply branch supplies power to the load, outputting a first drive signal to the first switch device and outputting a second drive signal to the second switch device; and controlling the first drive signal and the second drive signal to have a phase difference with an input voltage of the bypass power supply branch; or when a load current of the bypass power supply branch is less than a first threshold, outputting an inverter control signal to control the inverter power supply branch to charge the energy storage battery; or when a current of the inverter power supply branch flows back to an input end of the bypass power supply branch, turning off the first switch device and the second switch device via the inverter power supply branch.

In the foregoing control method for the uninterruptible power supply system, when the bypass power supply branch supplies power to the load, the first drive signal and the second drive signal are controlled to have the phase difference with the input voltage of the bypass power supply branch (that is, a phase of the first drive signal is asynchronous with a phase of the input voltage, and a phase of the second drive signal is asynchronous with the phase of the input voltage), so that the bypass power supply branch may adapt to a load type with a leading power factor, a driving manner in which the first switch device and the second switch device are turned on in a time-division manner is supported, and the current of the inverter power supply branch does not flow back to the bypass power supply branch. In addition, if a percentage of the load current of the bypass power supply branch in a total load current is excessively small (less than the first threshold), current detection precision is low. In this case, a value, of the load current, that is obtained through detection may have a large error. During subsequent current compensation, a value of the current used for compensation is calculated based on the value of the load current. Therefore, when an error exists in the value, of the load current, that is obtained through detection, an error also exists in calculation of the value of the current used for compensation, and an error also exists in a finally obtained input PF of the bypass power supply branch. Therefore, when the bypass power supply branch supplies power to the load, if the percentage of the load current of the bypass power supply branch in the total load current is less than the first threshold, the inverter power supply branch is controlled to charge the energy storage battery, so that the bypass power supply branch not only needs to supply power to the load, but also needs to output a charging current to the inverter power supply branch. This increases the load current of the bypass power supply branch, and helps obtain a precise PF and increase an input power factor of the bypass power supply branch. In addition, the driving manner in which the first switch device and the second switch device are turned on in a time-division manner is supported, and the current of the inverter power supply branch does not flow back to the bypass power supply branch. In addition, after the current of the inverter power supply branch flows back to the bypass power supply branch, the first switch device and the second switch device may be forcibly turned off, so that the bypass power supply branch is disconnected, and duration for which the current of the inverter power supply branch flows back to the input end of the bypass power supply branch is reduced.

In some embodiments, phases of the first drive signal and the second drive signal are controlled to lead the phase of the input voltage of the bypass power supply branch.

The following is defined: Phases of a first drive signal $V_1$ and a second drive signal $V_2$ lead a phase of the input voltage $V_{in}$ in by $\psi$, and the input PF of the bypass=cos $\psi$. It can be learned that when $\psi$ is 0, that is, when the phases of the first drive signal $V_1$ and the second drive signal $V_2$ are consistent with the phase of the input voltage, if a phase of a bypass input current $I_{in}$ leads the phase of the input voltage $V_{in}$, a UPS output voltage is distorted. In this application, the phases of the first drive signal $V_1$ and the second drive signal $V_2$ are controlled to lead the phase of the input voltage $V_{in}$. When of the phase of the bypass input current $I_{in}$ leads the phase of the bypass input voltage $V_{in}$, the UPS output voltage is not distorted.

In some embodiments, the phases of the first drive signal and the second drive signal lead the phase of the input voltage by 0° to 36°.

Although the control method for the uninterruptible power supply system in this application has a lower requirement on the power factor, an excessively small power factor also affects quality of the UPS output voltage. In some embodiments, by setting the phases of the first drive signal and the second drive signal to lead the phase of the input voltage by $\psi$, where $\psi$ is 0° to 36°, the power factor PF, where PF=cos $\psi$, may be controlled to be greater than 0.8, so that a requirement on the quality of the UPS output voltage may be met.

In some embodiments, the control method for the uninterruptible power supply system further includes: outputting an inverter control signal to control the inverter power supply branch to output a compensation current to compensate for a reactive current and a harmonic current in the load current of the bypass power supply branch, to increase the bypass input power factor.

According to the calculation formula of the bypass input power factor, when the harmonic current and the fundamental reactive current in the total current decrease, the power factor increases. Therefore, the inverter power supply branch outputs the compensation current to compensate for the harmonic current and the fundamental reactive current in the load current of the bypass power supply branch, so that the bypass input power factor can be increased, and the driving manner in which the first switch device and the second switch device are turned on in a time-division manner is supported.

In some embodiments, the phases of the first drive signal and the second drive signal are synchronous with or lead a phase of the load current.

In some embodiments, the control method for the uninterruptible power supply system further includes: when the load current of the bypass power supply branch is less than the first threshold, outputting the first drive signal and the second drive signal to control the bypass power supply branch to be disconnected, and controlling the energy storage battery to be discharged, to supply power to the load through the inverter power supply branch.

A capacity of the energy storage battery is limited. After the energy storage battery is fully charged, charging cannot continue. In some embodiments, the energy storage battery is controlled to be discharged to supply power to the load, so that electricity of the energy storage battery can be released. When the load current of the bypass power supply branch is less than the first threshold next time, the energy storage battery is in a rechargeable state.

In some embodiments, when the load current of the bypass power supply branch is less than the first threshold, the uninterruptible power supply system is controlled to work alternately in a first working manner and a second working manner. The first working manner is: supplying, by the bypass power supply branch, power to the load, and outputting the inverter control signal to control the inverter power supply branch to charge the energy storage battery. The second working manner is: outputting the first drive signal and the second drive signal to control the bypass power supply branch to be disconnected, and controlling the energy storage battery to be discharged, to supply power to the load through the inverter power supply branch.

The uninterruptible power supply system is enabled to work alternately in the first working manner and the second working manner, so that the energy storage battery can work alternately in a charging state and a discharging state. This helps release electricity of the energy storage battery in time, so that the energy storage battery is in a chargeable state when the load current of the bypass power supply branch is less than the first threshold next time.

In some embodiments, the first threshold is 5%.

That is, when the load current of the bypass power supply branch is less than 5% of the total load current, it is considered that the percentage of the load current of the bypass power supply branch in the total load current is excessively small. In this case, current detection precision may be low, and the load current needs to be increased to ensure quality of the output voltage.

In some embodiments, the uninterruptible power supply system further includes the inverter power supply branch and the energy storage battery. The inverter power supply branch and the bypass power supply branch are connected in parallel, and a node between the inverter power supply branch and the bypass power supply branch is connected to the load. The control method for the uninterruptible power supply system further includes: outputting an inverter control signal to the inverter power supply branch to control the inverter power supply branch to supply power to the load; detecting whether the current of the inverter power supply branch flows back to an input side of the bypass power supply branch; and when the current of the inverter power supply branch flows back to the input side of the bypass power supply branch, controlling an output voltage of the inverter power supply branch, to turn off the first switch device and the second switch device.

In some working conditions, the first drive signal and the second drive signal that drive the bypass power supply branch are still consistent (the first drive signal and the second drive signal are effective at the same time). As a result, a risk of current backflow exists when the bypass power supply branch is switched to the inverter power supply branch for power supply. In these working conditions, a response is required for the system in which the current backflow has occurred. In some embodiments, a response manner is to control the inverter power supply branch to drive the bypass power supply branch to be disconnected. In this way, the bypass power supply branch may be forcibly disconnected, so that the inverter power supply branch can normally supply power to the load.

In some embodiments, the detecting whether the current of the inverter power supply branch flows back to an input side of the bypass power supply branch includes: detecting whether the load current of the bypass power supply branch is greater than a second threshold, and keeping duration for which the load current of the bypass power supply branch is greater than the second threshold be greater than a third threshold.

When the bypass power supply branch is switched to the inverter power supply branch, a current of the bypass power supply branch is almost close to 0. However, when the current of the inverter power supply branch flows back to the bypass power supply branch, a large current value may be detected on the bypass power supply branch. Therefore, in some embodiments, whether the current backflow occurs in this case is determined by detecting the current of the bypass power supply branch. In addition, the current of the bypass power supply branch is directly detected, to accurately determine whether the current backflow occurs.

In some embodiments, the second threshold is 20% of a rated input current value of the bypass power supply branch.

The bypass power supply branch includes the first switch device and the second switch device. According to working principles of the first switch device and the second switch device, after the first drive signal and the second drive signal jump to a low level, the first switch device and the second switch device cannot be turned off immediately, but are turned off after the current gradually decreases to 0. Therefore, after the bypass power supply branch is switched to the inverter power supply branch to supply power to the load, a weak current still exists on the bypass power supply branch in a short time period. It cannot be considered that there is current backflow provided that a current exists on the bypass power supply branch. In some embodiments, it is considered that it is normal that the current of the bypass power supply branch is less than 20% of the rated input current value, but that the current of the bypass power supply branch is greater than 20% of the rated input current value is caused by the fact that the current of the inverter power supply branch flows back.

In some embodiments, the detecting whether the current of the inverter power supply branch flows back to an input side of the bypass power supply branch includes: detecting whether the current of the inverter power supply branch is greater than a fourth threshold, and keeping duration for which the current of the inverter power supply branch is greater than the fourth threshold be greater than a fifth threshold.

When the current of the inverter power supply branch flows back to the bypass power supply branch, the current of the inverter power supply branch also increases. Therefore, in some other embodiments, whether the current backflow exists may be indirectly determined by detecting the current of the inverter power supply branch. In a UPS, because the inverter power supply branch has a current sensor originally, an existing hardware structure may be used. Therefore, no additional hardware structure is required for the determining manner in this embodiment.

In some embodiments, the fourth threshold is 150% of a rated current of an inverter.

The current of the inverter power supply branch is not constant, and may also fluctuate within a specific range. In some embodiments, it is considered that it is abnormal that the current of the inverter power supply branch exceeds 150% of the rated current of the inverter, and it is determined that a problem of the current backflow exists in this case.

In some embodiments, when the current of the inverter power supply branch flows back to the bypass power supply branch, and the input voltage is at a phase angle of 0° to 90° or 180° to 270°, the output voltage of the inverter power supply branch is controlled, so that the first switch device and the second switch device are turned off.

In some embodiments, duration of current backflow may be reduced by using a response mechanism when the current backflow occurs, so that duration for which the UPS output voltage is abnormal is shortened to some extent. If the current backflow occurs when the input voltage is at a phase angle of 90° to 180° or a phase angle of 270° to 360°, the inverter power supply branch is controlled, so that the bypass power supply branch is forcibly disconnected, to shorten the duration for which the UPS output voltage is abnormal. A difference in the duration for which the UPS output voltage is abnormal is not significant (the duration for which the UPS output voltage is abnormal is less than 5 ms).

In some embodiments, the inverter power supply branch includes the inverter. The controlling an output voltage of the inverter power supply branch, to turn off the first switch device and the second switch device includes: controlling the inverter to output a voltage signal at a first level, to turn off the first switch device and the second switch device.

When the inverter power supply branch normally supplies power to the load, the inverter outputs a high-level voltage signal. In some embodiments, the inverter is controlled to output a low-level voltage signal, so that the bypass power supply branch bears a reverse voltage, and currents of the first switch device and the second switch device rapidly decrease to 0. In this way, the first switch device and the second switch device are turned off, the bypass power supply branch is disconnected, and the problem that the current of the inverter power supply branch flows back is resolved.

According to a second aspect of this application, a controller is provided. The controller stores a computer program. When the computer program is executed, any one of the foregoing control methods for an uninterruptible power supply system is implemented.

The foregoing controller stores the computer program. When the computer program is executed, the steps in any one of the foregoing control methods for an uninterruptible power supply system are implemented. In the foregoing control method for the uninterruptible power supply system, when a bypass power supply branch supplies power to a load, phases of a first drive signal and a second drive signal are controlled, so that the bypass power supply branch may adapt to a load type with a leading input power factor, a driving manner in which a first switch device and a second switch device are turned on in a time-division manner is supported, and a current of an inverter power supply branch does not flow back to the bypass power supply branch. A power supply time sequence of the bypass power supply branch and the inverter power supply branch is controlled, so that a percentage of an active current input to the bypass power supply branch is increased, current detection precision is increased, an input power factor of the bypass power supply branch is increased, and the current of the inverter power supply branch cannot flow back to the bypass power supply branch. In addition, after the current of the inverter power supply branch flows back to the bypass power supply branch, the first switch device and the second switch device may be forcibly turned off, so that the bypass power supply branch is disconnected, and duration for which the current of the inverter power supply branch flows back to an input end of the bypass power supply branch is reduced.

According to a third aspect of this application, an uninterruptible power supply system is provided, and the system includes: a bypass power supply branch, a load, and the foregoing controller. The bypass power supply branch is separately connected to the controller and the load. The controller is configured to drive the bypass power supply branch to supply power to the load.

The foregoing controller stores a computer program. When the computer program is executed, the steps in any one of the foregoing control methods for an uninterruptible power supply system are implemented. In the foregoing control method for the uninterruptible power supply system, when the bypass power supply branch supplies power to the load, a phase relationship between a first drive signal and a second drive signal is controlled, so that the bypass power supply branch may adapt to a load type with a leading input power factor, a driving manner in which a first switch device and a second switch device are turned on in a time-division manner is supported, and a current of an inverter power supply branch does not flow back to the bypass power supply branch. A power supply time sequence of the bypass power supply branch and the inverter power supply branch is controlled, so that a percentage of an active current input to the bypass power supply branch is increased, current detection precision is increased, an input power factor of the bypass power supply branch is increased, and the current of the inverter power supply branch cannot flow back to the bypass power supply branch. In addition, after the current of the inverter power supply branch flows back to the bypass power supply branch, the first switch device and the second switch device may be forcibly turned off, so that the bypass power supply branch is disconnected, and duration for which the current of the inverter power supply branch flows back to an input end of the bypass power supply branch is reduced.

In some embodiments, the bypass power supply branch includes a current detection unit, and the current detection unit is configured to detect a current of the bypass power supply branch.

In some working conditions, the first drive signal and the second drive signal that drive the bypass power supply branch are still consistent (the two signals are effective at the same time). As a result, a risk of current backflow exists when the bypass power supply branch is switched to the inverter power supply branch for power supply. In these working conditions, a response is required for the system in which the current backflow has occurred. In some embodiments, a response manner is to control the inverter power supply branch to drive the bypass power supply branch to be disconnected. In this way, the bypass power supply branch may be forcibly disconnected, so that the inverter power supply branch can normally supply power to the load. In some embodiments, whether the current backflow occurs is determined by detecting the current of the bypass power supply branch. Therefore, the bypass power supply branch is set to include the current detection unit, to monitor whether the current backflow occurs, and ensure quality of a UPS output voltage.

DESCRIPTION OF REFERENCE SIGNS OF MAIN COMPONENTS

| UPS system | 1 and 2 |
|---|---|
| UPS | 10 |
| Bypass power supply branch | 11 |
| Input end | 110 |
| Switch assembly | 111 |
| First switch device | 112 |
| Second switch device | 113 |
| Control end | 114 |
| Inverter power supply branch | 12 |
| Inverter | 121 |
| DC/DC converter | 122 |
| Power grid | 20 |
| Energy storage battery | 30 |
| Load | 40 |
| Controller | 50 |
| First drive signal | $V_1$ |
| Second drive signal | $V_2$ |
| Input voltage | $V_{in}$ |
| Bypass input current | $I_{in}$ |
| Node | M |
| Output voltage | $V_{out}$ |

DESCRIPTION OF EMBODIMENTS

The following describes embodiments of this application with reference to the accompanying drawings in embodiments of this application.

It should be noted that, in this specification, when an element is described as "connected" to another element, the element may be directly connected to the another element or may be an element disposed in the middle. When a step is identified by a number, the number is not used to limit the sequence of the steps. Unless otherwise defined, all technical and scientific terms used in this specification have same meanings as those usually understood by a person skilled in the art of this application. The terms used herein in this specification of this application are only used to describe specific embodiments, and are not intended to limit this application. The term "and/or" used in this specification includes any and all combinations of one or more related listed items.

Figure 1:
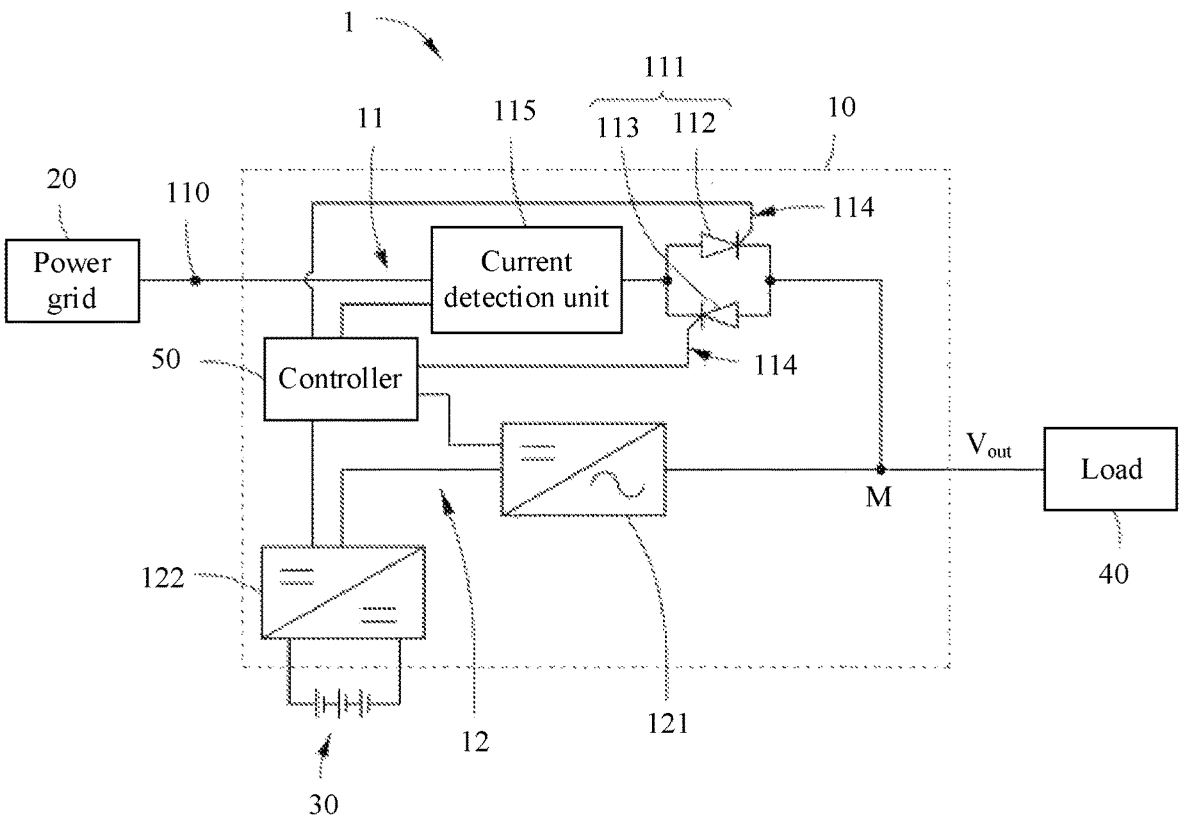
FIG. 1 is a schematic diagram of a structure of a UPS system according to an embodiment of this application.

Refer to FIG. 1. A UPS system 1 in this embodiment includes a UPS 10, a power grid 20, and an energy storage battery 30. The UPS 10 is separately connected to the power grid 20, the energy storage battery 30, and a load 40. The UPS 10 is configured to supply power to the load 40 based on the power grid 20 or the energy storage battery 30. In this embodiment, the power grid 20 may be mains power, and the load 40 includes, for example, an industrial power supply device, a home electric device, and the like.

In this embodiment, the UPS 10 includes a bypass power supply branch 11 and an inverter power supply branch 12. The bypass power supply branch 11 has a bypass input end 110, and the bypass input end 110 is connected to the power grid 20. The inverter power supply branch 12 is connected to the energy storage battery 30. A node M between the bypass power supply branch 11 and the inverter power supply branch 12 is connected to the load 40. The bypass power supply branch 11 and the inverter power supply branch 12 are connected in parallel, and are configured to separately supply power to the load 40. In this embodiment, the UPS system 1 works in an ECO mode, and the bypass power supply branch 11 preferentially supplies power to the load 40. When the bypass power supply branch 11 is faulty (for example, a power failure or undervoltage), the bypass power supply branch 11 is switched to the inverter power supply branch 12 to supply power. In this embodiment, the energy storage battery 30 is charged when the bypass power supply branch 11 supplies power to the load 40, and is discharged when the inverter power supply branch 12 supplies power to the load.

In this embodiment, the UPS system 1 further includes a controller 50. The controller 50 is separately connected to the bypass power supply branch 11 and the inverter power supply branch 12, and is configured to separately control working processes of the bypass power supply branch 11 and the inverter power supply branch 12.

In this embodiment, the bypass power supply branch 11 includes a switch assembly 111, and the switch assembly 111 includes a first switch device 112 and a second switch device 113 that are connected in anti-parallel. In this embodiment, the first switch device 112 and the second switch device 113 are silicon controlled rectifiers (Silicon Controlled Rectifiers, SCRs). The first switch device 112 and the second switch device 113 each have a control end 114. The controller 50 is separately connected to the control end 114 of the first switch device 112 and the control end 114 of the second switch device 113. The controller 50 is configured to respectively output a first drive signal and a second drive signal to the control end 114 of the first switch device 112 and the control end 114 of the second switch device 113, to drive the first switch device 112 and the second switch device 113 to be turned on or turned off, so as to control the bypass power supply branch 11 to be connected or be open.

When the first drive signal is at a high level, the first drive signal may drive the first switch device 112 to be turned on. When the second drive signal is at a high level, the second drive signal may drive the second switch device 113 to be turned on. An input signal of the bypass power supply branch 11 is an alternating current signal, and the alternating current signal has a part located in a positive half cycle and a part located in a negative half cycle, so that the bypass power supply branch 11 may transmit currents in two directions. Therefore, based on the given first drive signal and the second drive signal the first switch device 112 and the second switch device 113 that are connected in anti-parallel are used to connect the bypass power supply branch 11 when the input signal is located in either the positive half cycle or the negative half cycle.

In this embodiment, the inverter power supply branch 12 includes an inverter 121 and a DC/DC converter 122 that are connected in series. The DC/DC converter 122 is separately connected to the inverter 121 and the energy storage battery 30. The energy storage battery 30 is configured to output a direct current signal, and the DC/DC converter 122 is configured to convert the direct current signal into another direct current signal with a different voltage. The inverter 121 is configured to convert the direct current signal output by the DC/DC converter 122 into an alternating current signal, to output the alternating current signal to the load 40. The controller 50 is connected to the inverter 121, and is configured to control a signal output of the inverter 21.

Figure 2:
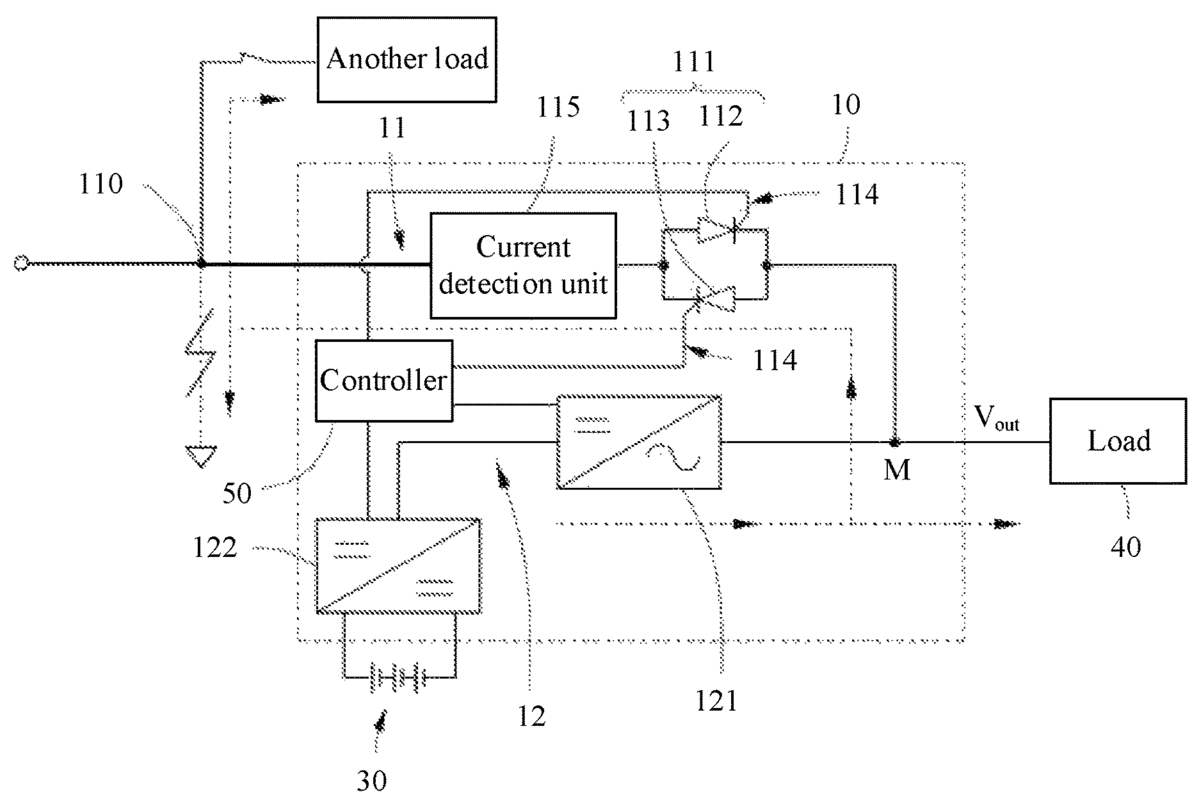
FIG. 2 is a schematic diagram of a current direction in a UPS when a current of an inverter power supply branch in a UPS system flows back to a bypass power supply branch according to an embodiment of this application.

In this embodiment, because the UPS system 1 works in the ECO mode, when the bypass power supply branch 11 supplies power abnormally, the bypass power supply branch 11 is switched to the inverter power supply branch 12. Refer to FIG. 2. When the bypass power supply branch 11 is switched to the inverter power supply branch 12, because the bypass power supply branch 11 is still in an on state, a current of the inverter power supply branch 12 may flow back to the input end 110 of the bypass power supply branch 11 (a dashed line in FIG. 2 indicates a current direction). As a result, the inverter 121 may supply power to another load (not a load that is planned to be powered by a UPS). Consequently, the inverter 121 is overloaded, and an output voltage output from the node M to the load 40 is abnormal. That is, an output voltage $V_{out}$ of the UPS 10 is abnormal.

In a technical solution, a driving method of the controller 50 is changed to prevent the current of the inverter power supply branch 12 from flowing back, so as to resolve the foregoing problem of the abnormal UPS output voltage.

Figure 3:
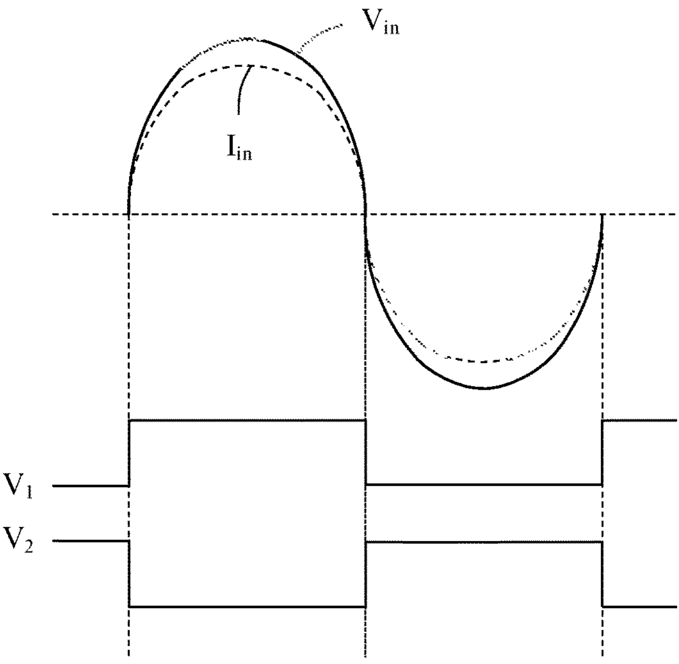
FIG. 3 is a schematic diagram of a driving manner of an SCR in a UPS system according to a comparison example.

Refer to FIG. 3. $V_{in}$ in FIG. 3 is a waveform of an input voltage at the bypass input end 110, and $I_{in}$ represents a waveform of a load current at the bypass input end 110. $V_1$ in FIG. 3 represents a waveform of the first drive signal that drives the first switch device 112. $V_2$ in FIG. 3 represents a waveform of the second drive signal that drives the second switch device 113.

It can be learned from FIG. 3 that, in this technical solution, when the bypass power supply branch 11 supplies power to the load 40, and the input voltage $V_{in}$ is in a positive half cycle, the first switch device 112 is turned on if the first drive signal $V_1$ output to the first switch device 112 is at the high level, and the second switch device 113 is turned off if the second drive signal $V_2$ output to the second switch device 113 is at a low level. When the input voltage $V_{in}$ is in a negative half cycle, the first switch device 112 is turned off if the first drive signal $V_1$ output to the first switch device 112 is at the low level, and the second switch device 113 is turned on if the second drive signal $V_2$ output to the second switch device 113 is at the high level.

That is, at a same moment, the first drive signal and the second drive signal that are output by the controller 50 to the first switch device 112 and the second switch device 113 are at opposite levels, and the first switch device 112 and the second switch device 113 are turned on in a time-division manner. When the bypass power supply branch 11 is switched, due to an input fault, to the inverter power supply branch 12 to supply power, the bypass power supply branch 11 is not connected, and it is difficult for the current of the inverter power supply branch 12 to flow back to a front end of the bypass power supply branch 11. Therefore, the foregoing driving manner helps resolve the problem of the abnormal UPS output voltage $V_{out}$ that is caused by the fact that the current of the inverter power supply branch 12 flows back.

A condition that needs to be satisfied when the foregoing driving manner is used is that a power factor (Power Factor, PF) of the bypass power supply branch 11 is close to 1. However, the input PF of the bypass power supply branch 11 is difficult to be close to 1 in the following cases:

1) When the load 40 changes, a fundamental reactive current and a harmonic current that are on a load side and that the inverter 121 compensates for have a time lag, which makes it difficult for the input PF of the bypass power supply branch 11 to be close to 1 in a period of time.
2) When a percentage of an active current of the load 40 is small (for example, less than 5%), due to a detection precision of the load current, after the inverter 121 compensates for the fundamental reactive current and the harmonic current on the load side, it is still difficult to control the input PF of the bypass power supply branch 11 to be close to 1.

Figure 4:
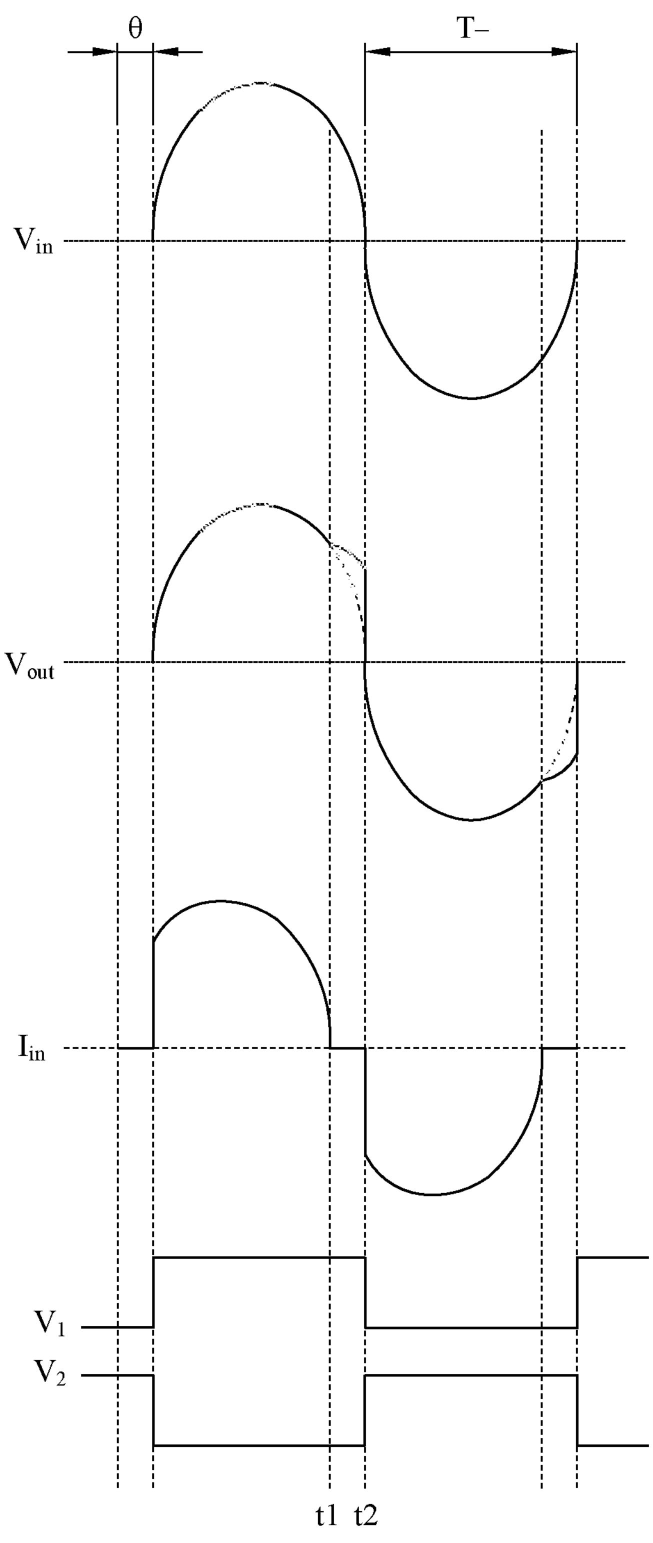
FIG. 4 is a schematic diagram of a waveform when a power factor of a load leads according to a comparison example.

Refer to FIG. 4. When the PF is low (not close to 1), in a process in which the bypass power supply branch 11 supplies power to the load 40, a phase difference 0 exists between a bypass input current $I_{in}$ and the input voltage $V_{in}$ of the bypass power supply branch 11. At a moment t1, the bypass input current $I_{in}$ crosses zero. In this case, the first switch device 112 is turned off, and the second switch device 113 should have been turned on when the first switch device 112 is turned off. However, because the driving manner in FIG. 3 is used (the first drive signal $V_1$ and the second drive signal $V_2$ have a same amplitude but opposite directions at a same moment), a time period in which the second drive signal $V_2$ of the second switch device 113 is at the high level corresponds to a time period T— in which the input voltage $V_{in}$ is in a negative half cycle. The second drive signal $V_2$ jumps to a high-level state only at a moment t2. Therefore, in a time period between the moment t1 and the moment t2, the first switch device 112 is turned off, but the second switch device 113 has not been turned on, that is, the second switch device 113 is also in an off state. In this case, the bypass power supply branch 11 is open, and the UPS 10 cannot provide a correct output voltage $V_{out}$. As a result, the output voltage $V_{out}$ is distorted in the time period between the moment t1 and the moment t2, and quality of a power supply voltage of the UPS 10 is affected.

It can be learned that, in the driving manner shown in FIG. 3, the PF needs to be as close as possible to 1 (a phase of the input voltage $V_1$ is synchronous with a phase of the bypass input current $I_{in}$) to ensure quality of the power supply voltage of the UPS 10.

This embodiment further provides a control method for an uninterruptible power supply system, and the method is applied to the controller 50. The controller 50 controls a working process of the UPS system 1 by performing the steps of the foregoing control method for the uninterruptible power supply system, so that the driving manner shown in FIG. 3 can adapt to a lower PF (where the PF may not be close to 1), to resolve the foregoing technical problem that the output voltage $V_{out}$ of the UPS 10 is distorted due to the low PF.

Figure 5:
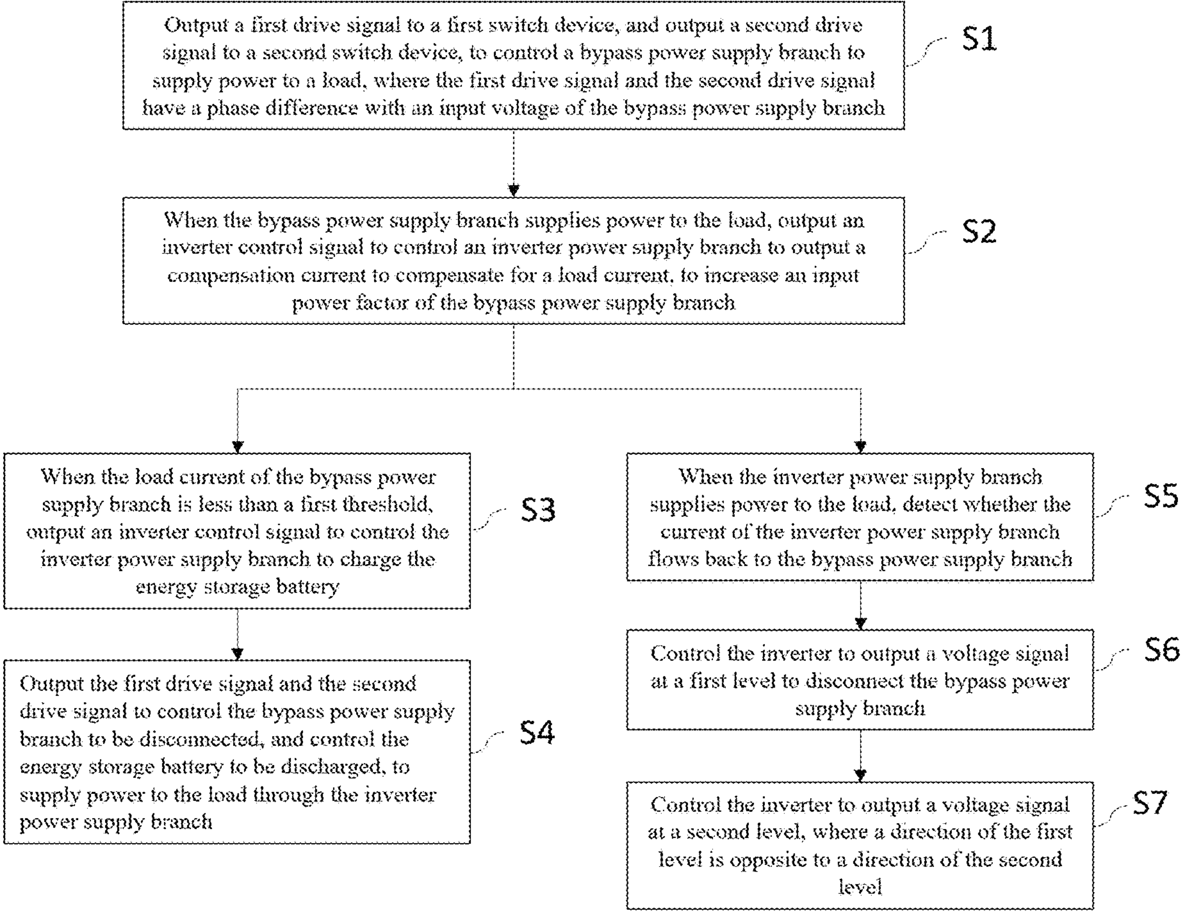
FIG. 5 is a flowchart of a control method for an uninterruptible power supply system according to an embodiment of this application.

Refer to FIG. 5. The control method for the uninterruptible power supply system in this embodiment includes the following steps:

Step S1: Output the first drive signal to the first switch device, and output the second drive signal to the second switch device, to control the bypass power supply branch to supply power to the load, where the first drive signal and the second drive signal have a phase difference with the input voltage of the bypass power supply branch.

Step S2: When the bypass power supply branch supplies power to the load, output an inverter control signal to control the inverter power supply branch to output a compensation current to compensate for the load current, to increase the input power factor of the bypass power supply branch.

In step S2, the first switch device 112 and the second switch device 113 of the bypass power supply branch 11 are driven in the driving manner shown in FIG. 3. In this embodiment, that the first drive signal $V_1$ and the second drive signal $V_2$ have a phase difference with the input voltage $V_{in}$ of the bypass power supply branch 11 specifically includes: Phases of the first drive signal $V_1$ and the second drive signal $V_2$ lead the phase of the input voltage $V_{in}$ of the bypass power supply branch 11. In this way, the foregoing driving manner can adapt to a lower PF, and even if the PF is not close to 1, the output voltage $V_{out}$ is not distorted. It is not required that an ideal output voltage $V_{out}$ can be obtained only when the PF is close to 1. In this embodiment, that the phases of the first drive signal $V_1$ and the second drive signal $V_2$ lead the phase of the input voltage $V_{in}$ of the bypass power supply branch 11 means that, relative to a timing start point t that is 0, the first drive signal $V_1$ and the second drive signal $V_2$ reach a zero value (or a maximum value) earlier than the input voltage $V_{in}$.

Figure 6:
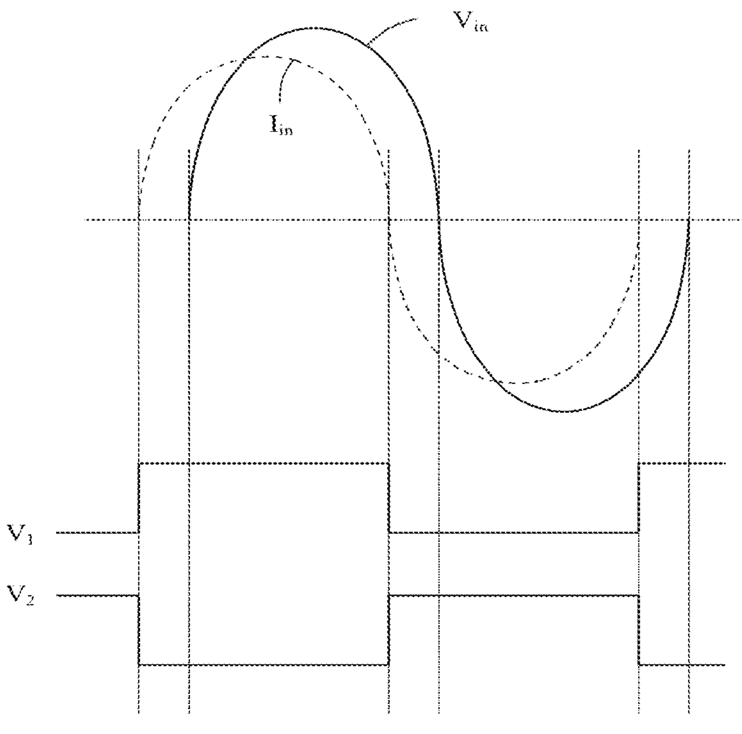
FIG. 6 is a schematic diagram of a driving manner of an SCR in a UPS system according to an embodiment of this application.

Refer to FIG. 6. The phases of the first drive signal $V_1$ and the second drive signal $V_2$ lead the phase of the input voltage $V_{in}$. The phase of the first drive signal $V_1$ and the second drive signal $V_2$ lead a phase of the bypass input current $I_{in}$, so that before the bypass input current $I_{in}$ crosses zero, levels of the first drive signal $V_1$ and the second drive signal $V_2$ jump (the high level is switched to the low level, or the low level is switched to the high level), to control working statuses (an on state or an off state) of the first switch device 112 and the second switch device 113 to change.

In this embodiment, the following is defined: The phases of the first drive signal $V_1$ and the second drive signal $V_2$ lead the input voltage $V_{in}$ by $\psi$, and the input PF of the bypass=cos $\psi$. It can be learned that when $\psi$ is 0, that is, when the phases of the first drive signal $V_1$ and the second drive signal $V_2$ are consistent with the phase of the input voltage, if the phase of the bypass input current $I_{in}$ leads the phase of the input voltage $V_{in}$, the UPS output voltage is distorted. In this embodiment, the phases of the first drive signal $V_1$ and the second drive signal $V_2$ are controlled to lead the phases of the input voltage $V_{in}$. When the phase of the bypass input current $I_{in}$ leads the phase of the input voltage $V_{in}$, the UPS output voltage is not distorted.

The output voltage $V_{out}$ of the UPS 10 may also be affected if the input PF of the bypass is excessively low. Therefore, a value of the input PF of the bypass should not be excessively small. In this embodiment, $0° < \psi \leq 36°$, so that $0.8 \leq$ the input PF of the bypass $\leq 1$.

In step S2, the inverter power supply branch 12 is controlled to provide the compensation current (including a fundamental reactive current and a harmonic current), to compensate for the reactive current and the harmonic current on the load side, and increase the input PF of the bypass. In this embodiment, the inverter power supply branch 12 is controlled to provide the fundamental reactive current and the harmonic current, so that the input PF of the bypass is greater than or equal to 0.8. In this embodiment, specific values of the fundamental reactive current and the harmonic current that are provided by the inverter power supply branch 12 are calculated by the controller 50 according to a preset formula.

For the foregoing problem 1), the phases of the bypass drive signals are controlled to lead the phase of the input voltage $V_{in}$ that is input to the bypass input end 110, so that the foregoing driving manner can adapt to a lower bypass input PF. That is, in this embodiment, the phases of the bypass drive signals are controlled to lead the phase of the input voltage $V_{in}$ that is input to the bypass input end 110, so that the input PF of the bypass is not required to be close to 1, and the input PF of the bypass can just be greater than or equal to 0.8.

For the foregoing problem 2), when the load current of the bypass power supply branch is less than a first threshold, the control method for the uninterruptible power supply system in this embodiment further includes:

Step S3: Output an inverter control signal to control the inverter power supply branch to charge the energy storage battery.

In this embodiment, the first threshold is 5%. That is, when a percentage of the load current in a rated current on the load side is less than 5%, current detection precision is low. In this case, the specific values of the fundamental reactive current and the harmonic current that are determined based on a value, of the load current, that is obtained through detection make it difficult for the PF to be greater than 0.8.

Figure 7:
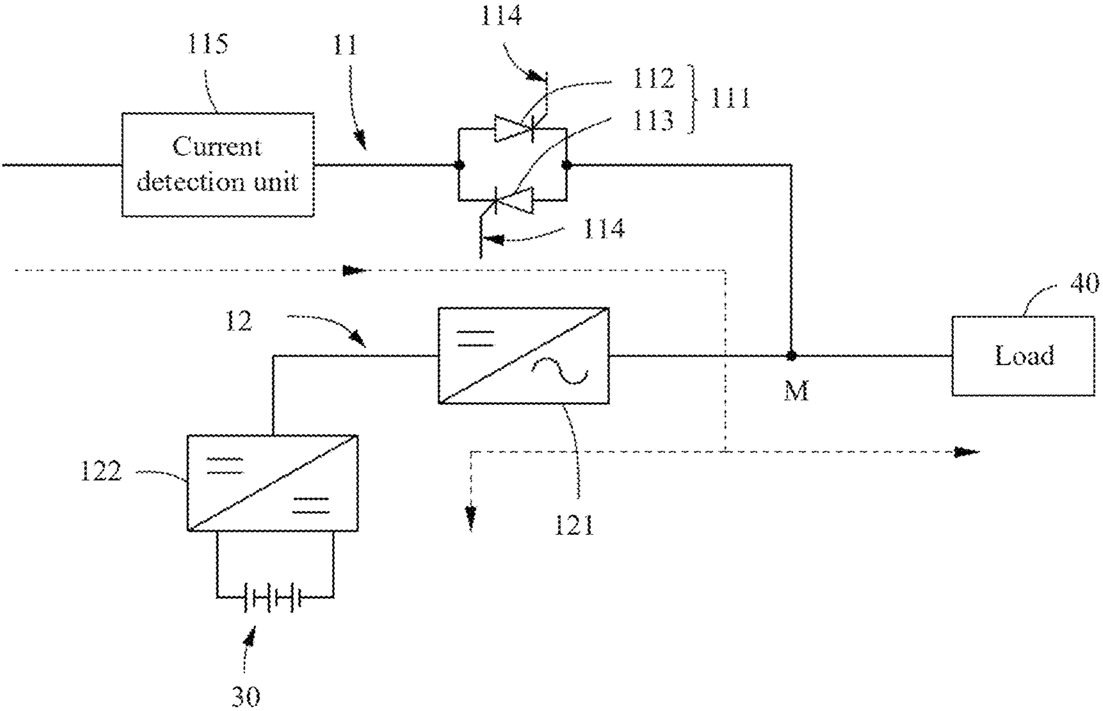
FIG. 7 is a schematic diagram of a current direction of a UPS system during a first working manner according to an embodiment of this application.

To avoid that the PF cannot meet a requirement due to the detection precision, refer to FIG. 7. In this embodiment, in step S3, the inverter power supply branch 12 is controlled to be turned on to charge the energy storage battery 30, and the bypass power supply branch 11 therefore further needs to provide a charging current for charging the energy storage battery 30. Therefore, this helps increase the bypass input current $I_{in}$, of the bypass power supply branch 11, so that the PF is greater than 0.8, to adapt to the driving manner in FIG. 3.

Because a capacity of the energy storage battery 30 is limited, a case in which the energy storage battery 30 is fully charged exists. Therefore, in this embodiment, the control method for the uninterruptible power supply system further includes:

Step S4: Output the first drive signal and the second drive signal to control the bypass power supply branch to be disconnected, and control the energy storage battery to be discharged, to supply power to the load through the inverter power supply branch.

Figure 8:
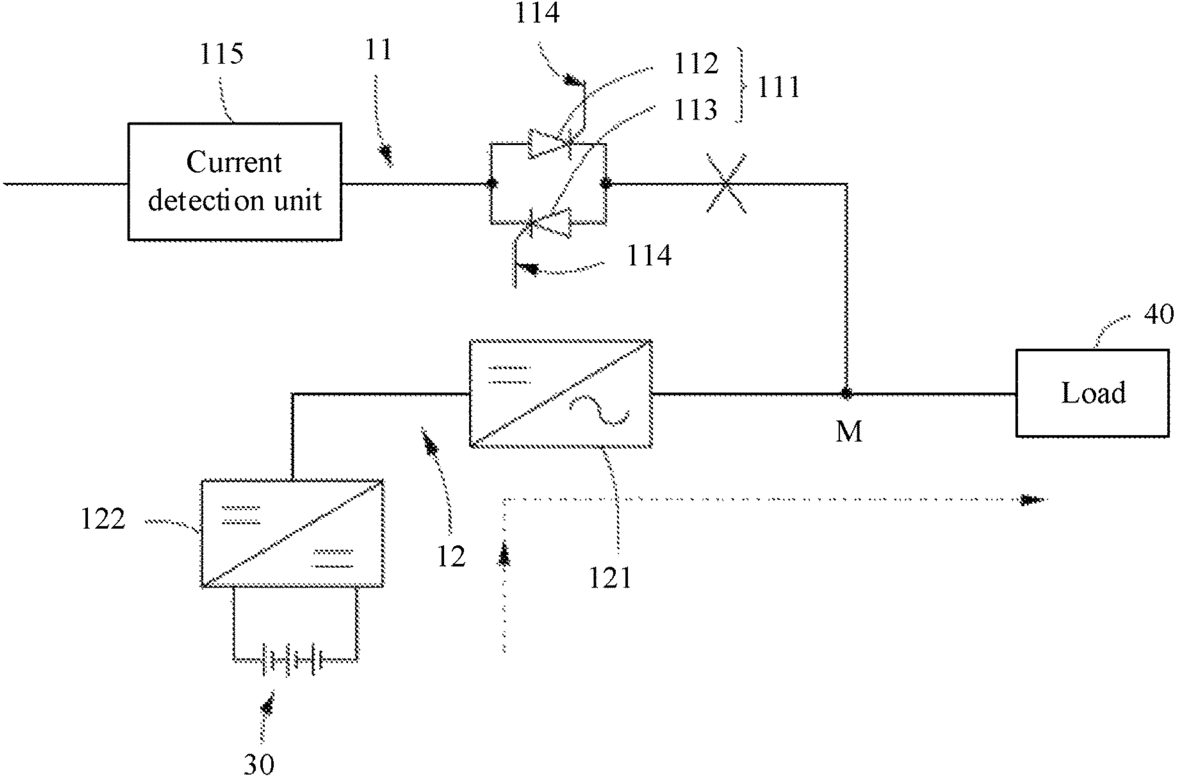
FIG. 8 is a schematic diagram of a current direction of a UPS system during a second working manner according to an embodiment of this application.

Refer to FIG. 8, in step S4, level statuses of the first drive signal and the second drive signal are switched, so that the bypass power supply branch 11 is in an open state. The bypass power supply branch 11 no longer supplies power, and the energy storage battery 30 is controlled to be discharged to supply power to the load 40. In this way, the energy storage battery 30 may release electrical energy.

In some embodiments, when the load current of the bypass power supply branch is less than the first threshold, the UPS system 1 may be further controlled to work alternately in a first working manner and a second working manner.

The first working manner is: outputting the inverter control signal to control the inverter power supply branch to charge the energy storage battery.

The second working manner is: outputting the first drive signal and the second drive signal to control the bypass power supply branch to be disconnected, and controlling the energy storage battery to be discharged, to supply power to the load through the inverter power supply branch.

That is, the controller 50 alternately performs steps S3 and S4. In this way, the energy storage battery 30 can be charged when the UPS system 1 works in the first working manner, a current of the bypass power supply branch 11 is increased, and the current detection precision is increased. In addition, the energy storage battery 30 is controlled to release electrical energy in time when the UPS system 1 works in the second working manner, so that the energy storage battery 30 can be in a chargeable state before the load current is less than the first threshold next time.

Figure 9:
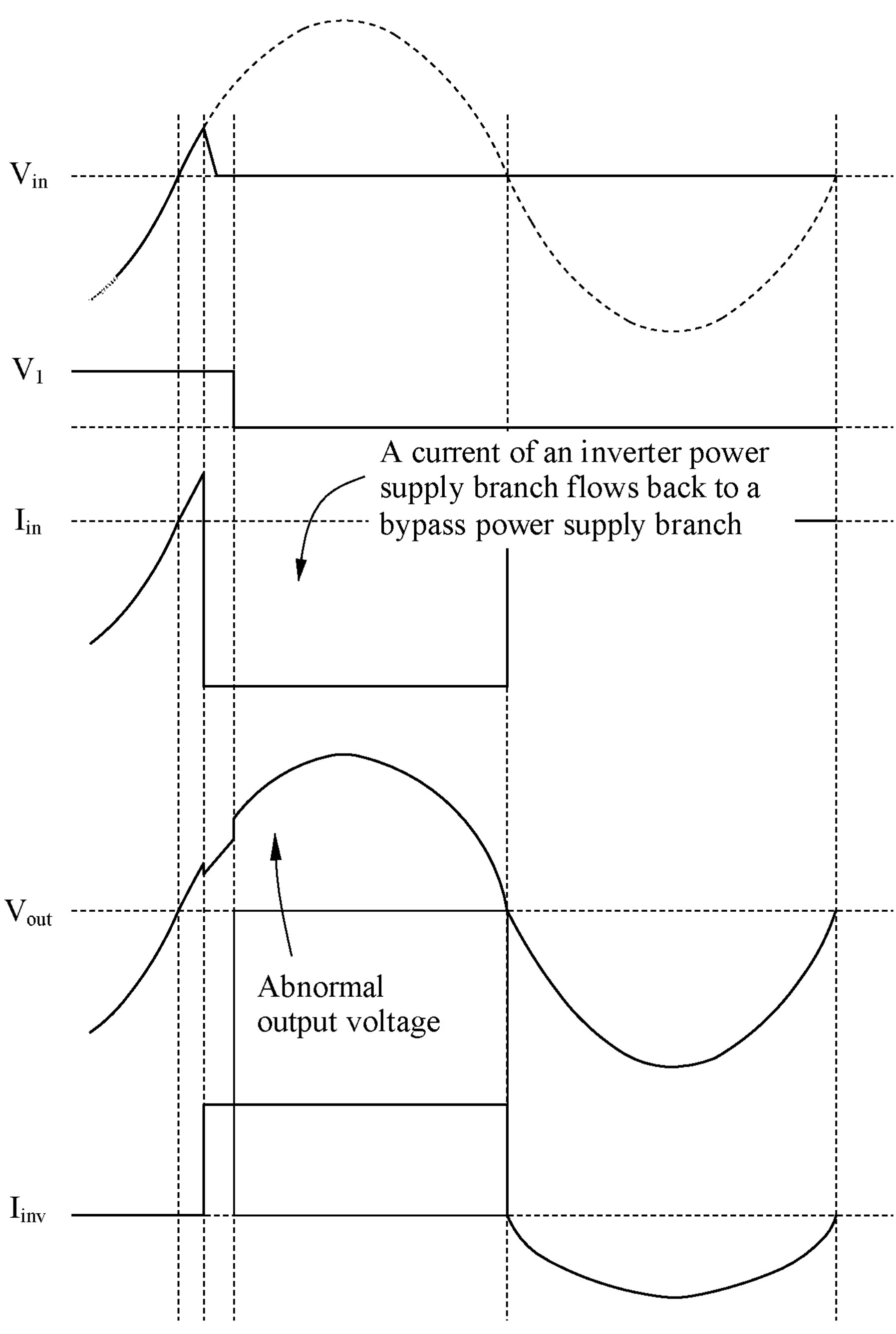
FIG. 9 is a schematic diagram of a waveform of a signal of a UPS system when a current of an inverter power supply branch flows back to a bypass power supply branch according to a comparison example.

Refer to FIG. 9. In some working conditions (where the input PF of the bypass is small, the load is small, or the load is in a dynamic transition process), to avoid the abnormal output voltage $V_{out}$ shown in FIG. 4, in the foregoing working conditions, the driving manner of the switch assembly 111 still uses a solution in which the first drive signal and the second drive signal are consistent (that is, the first drive signal and the second drive signal are both at the high level). In this case, there is a risk that the current of the inverter power supply branch 12 flows back to the bypass power supply branch 11. When the current of the inverter power supply branch 12 flows back to the bypass power supply branch 11, quality of the UPS output voltage $V_{out}$ cannot be ensured, and the output voltage $V_{out}$ is interrupted for about 10 ms.

In this embodiment, the control method for the uninterruptible power supply system further includes:

Step S5: When the inverter power supply branch supplies power to the load, detect whether the current of the inverter power supply branch flows back to the bypass power supply branch.

If the current of the inverter power supply branch flows back to the bypass power supply branch, step S6 is performed: Control the inverter power supply branch to drive the bypass power supply branch to be disconnected.

In step S5, a manner of detecting whether the current of the inverter power supply branch flows back to the bypass power supply branch is: when both the first drive signal and the second drive signal are at the low level, detecting whether the current of the bypass power supply branch 11 is greater than a second threshold and duration is greater than a third threshold. In this case, if the current of the bypass power supply branch 11 is greater than the second threshold and the duration is greater than the third threshold, it indicates that the current of the inverter power supply branch 12 flows back to the bypass power supply branch 11. If the current of the bypass power supply branch 11 is less than or equal to the second threshold, it indicates that the current of the inverter power supply branch does not flow back to the bypass power supply branch 11.

When the bypass power supply branch 11 is switched to the inverter power supply branch 12, the current of the bypass power supply branch 11 is almost close to 0. However, when the current of the inverter power supply branch 12 flows back to the bypass power supply branch 11, a large current value may be detected on the bypass power supply branch 11. Therefore, in some embodiments, whether the current backflow occurs in this case is determined by detecting the current of the bypass power supply branch 11. In addition, the current of the bypass power supply branch 11 is directly detected, to accurately determine whether the current backflow occurs.

In the foregoing embodiment, the bypass power supply branch 11 further includes a current detection unit 115 (refer to FIG. 7 and FIG. 8), and the current detection unit 115 is connected between the power grid 20 and the switch assembly 111, and is configured to detect the current of the bypass power supply branch 11. The current detection unit 115 is connected to the controller 50, and is configured to feed back the current of the bypass power supply branch 11 to the controller 50. The current detection unit 115 may be a current sensor, a current sampling circuit, or the like.

In some embodiments, the second threshold is, for example, 20% of a rated input current of the bypass power supply branch 11, and the third threshold is, for example, 2 ms. That is, when it is detected that the current of the bypass power supply branch 11 is greater than 20% of the rated input current and the duration is greater than 2 ms, it is considered that the current of the bypass power supply branch 11 is formed as a result of the fact that the current of the inverter power supply branch 12 flows back.

In step S5, the manner of detecting whether the current of the inverter power supply branch 12 flows back to the bypass power supply branch 11 may alternatively be: detecting whether the current of the inverter power supply branch is greater than a fourth threshold and duration is greater than a fifth threshold.

For the inverter power supply branch 12, when the inverter power supply branch 12 works normally (that is, the current does not flow back to the bypass power supply branch, and the inverter power supply branch 12 supplies power only to the load 40), a current value is within a specific range. If the current value exceeds the range, it indicates that the current of the inverter power supply branch 12 is abnormal. In this case, it is determined that the current of the inverter power supply branch 12 may flow back to the bypass power supply branch 11.

In some embodiments, the fourth threshold is, for example, 150% of a rated current of the inverter 121, and the fifth threshold is, for example, 2 ms. That is, when it is detected that the current of the inverter power supply branch 12 is greater than 150% of the rated current of the inverter 121 and the duration is greater than 2 ms, it is considered that the current of the inverter power supply branch 12 is formed as a result of that fact that the current of the inverter power supply branch 12 flows back instead of normal current fluctuation.

Because a conventional inverter power supply branch 12 includes a function unit for detecting a current, in this embodiment, no additional hardware structure is required for detecting whether the current of the inverter power supply branch 12 flows back.

In step S6, the controlling the inverter power supply branch to drive the bypass power supply branch to be disconnected includes: controlling the inverter to output a voltage signal at a first level to disconnect the bypass power supply branch.

After step S6, the control method for the uninterruptible power supply system in this embodiment further includes step S7: Control the inverter to output a voltage signal at a second level, where a direction of the first level is opposite to a direction of the second level.

In this embodiment, when it is determined that the current of the inverter power supply branch 12 has flowed back to the bypass power supply branch 11, the controller 50 controls the inverter 121 to output the voltage signal at the first level, so that the bypass power supply branch bears a reverse voltage, and the current of the bypass power supply branch 11 gradually decreases until the bypass power supply branch 11 is in an open state. In this embodiment, duration of outputting the voltage signal at the first level by the inverter 121 is, for example, 2 ms.

In step S7, the bypass power supply branch 11 is already in an open state, and the problem that the current of the inverter power supply branch 12 flows back to the bypass power supply branch 11 is resolved. In this case, the controller 50 controls the inverter 121 to output the voltage signal at the second level, and the inverter power supply branch 12 continues to normally supply power to the load 40.

Figure 10:
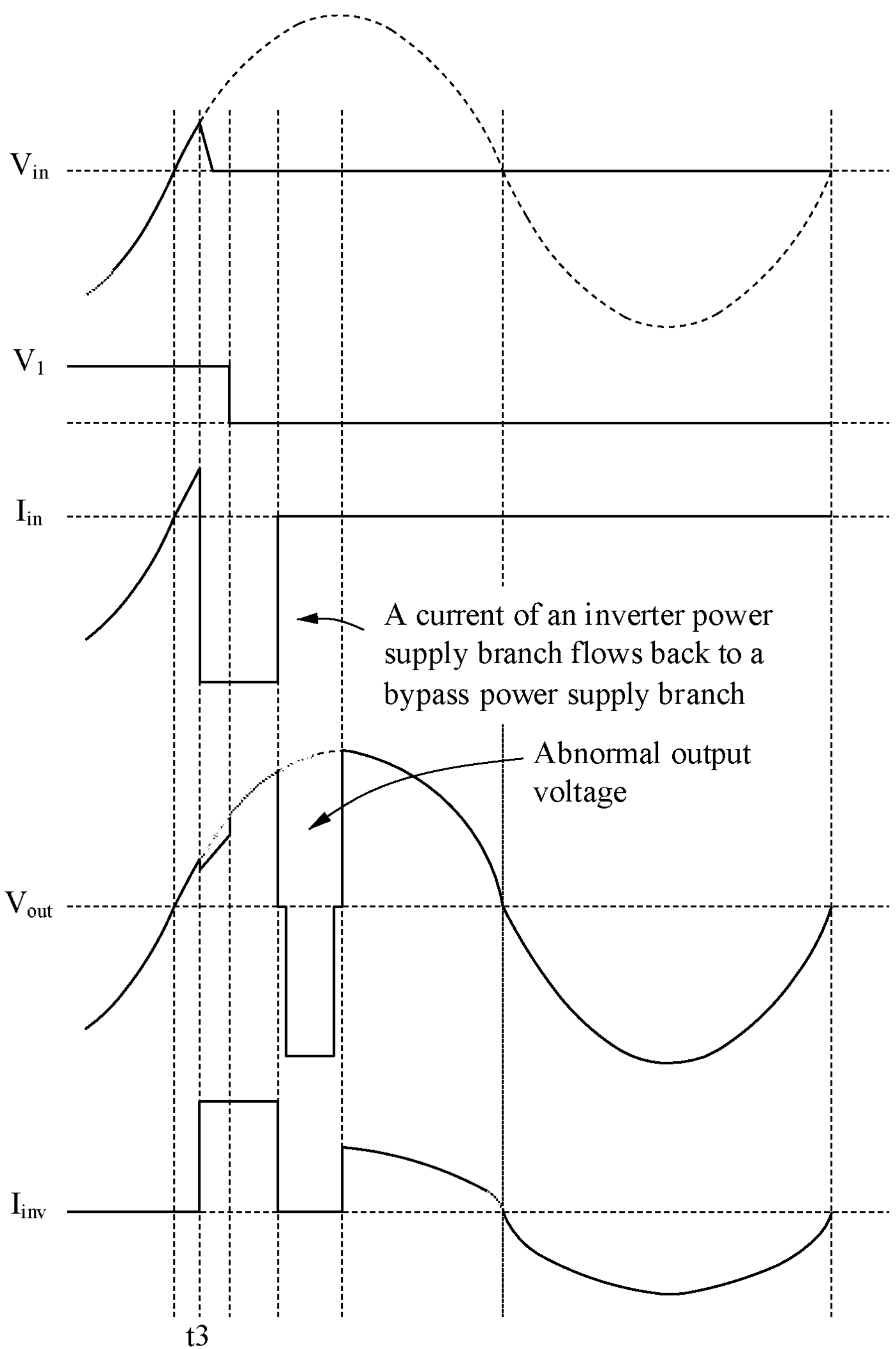
FIG. 10 is a schematic diagram of a waveform of a signal of a UPS system when a current of an inverter power supply branch flows back to a bypass power supply branch according to an embodiment of this application.

For a driving manner of steps S5 to S7, refer to FIG. 10. At a moment t3, an abnormal power failure occurs on the input voltage $V_{in}$ of the bypass power supply branch 11, and the output voltage $V_{out}$ is also abnormal. In this case, the controller 50 controls the first drive signal and the second drive signal to switch to a low-level state to turn off the switch assembly 111, and the system switches to the inverter power supply branch 12 to supply power to the load 40. When the energy storage battery is discharged, the current of the inverter power supply branch 12 flows back to the bypass power supply branch 11. Consequently, a current exists on the bypass power supply branch 11, and quality of the output voltage $V_{out}$ of the UPS 10 cannot be ensured. In this case, the current backflow is detected, and the controller 50 controls the inverter 121 to output the voltage signal at the first level, so that the bypass power supply branch 11 is forcibly disconnected, to resolve the problem of the current backflow. After the bypass power supply branch 11 is in an open state, the controller 50 controls the inverter 121 to output the voltage signal at the second level, and the inverter power supply branch 12 normally supplies power to the load 40.

In some embodiments, when it is detected in step S5 that the current of the inverter power supply branch 12 flows back to the bypass power supply branch 11, step S6 is not performed immediately, but a phase angle of the input voltage $V_{in}$ is detected again. When the input voltage $V_{in}$ is at a phase angle of 0° to 90° or 180° to 270°, step S6 is performed.

Duration of current backflow may be reduced by performing step S6, so that duration for which the UPS output voltage is abnormal is shortened to some extent (shortened by about 5 ms). In a comparison example, if step S6 is not performed when the current backflow occurs, the system interrupts output of the UPS 10 for a period of time (about 10 ms) when a power failure is detected on the input voltage $V_{in}$, and then restores the output voltage $V_{out}$ of the UPS 10. When the input voltage is at a phase angle of 90° to 180° or a phase angle of 270° to 360°, it takes about 5 ms to restore normal output of the UPS 10 either in the manner of interrupting the UPS output voltage or in the manner of performing step S6. In this case, performing step S6 is meaningless. Therefore, when the input voltage $V_{in}$ is at a phase angle of 90° to 180° or a phase angle of 270° to 360°, step S6 is not performed. When the input voltage $V_{in}$ is at a phase angle of 0° to 90° or 180° to 270°, step S6 is performed: Control the inverter power supply branch 12 to drive the bypass power supply branch 11 to be open. This helps simplify a driving process that is unnecessary for the controller 50.

The foregoing control method for the uninterruptible power supply system is described based on an architecture of the UPS system 1 shown in FIG. 1.

Figure 11:
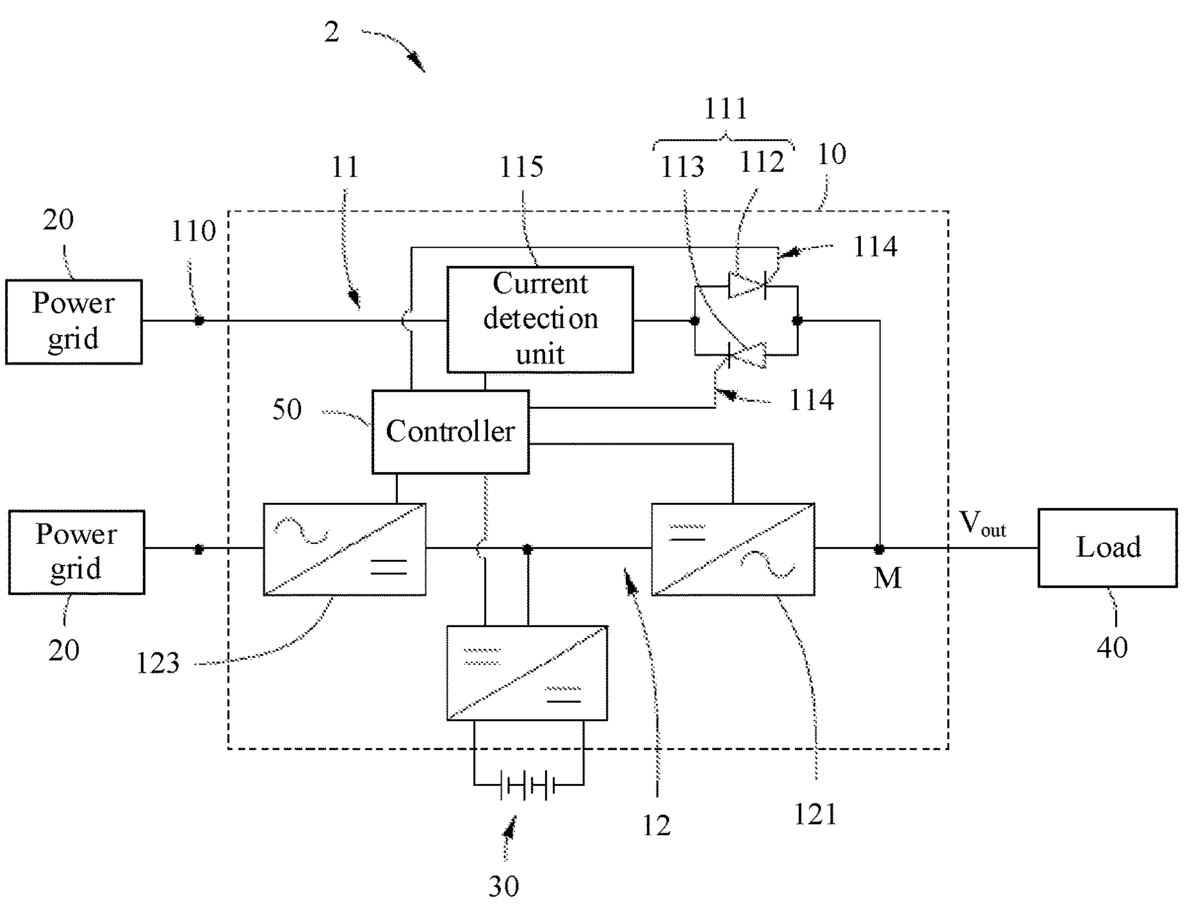
FIG. 11 is a schematic diagram of a structure of another UPS system to which a control method for an uninterruptible power supply system is applied according to an embodiment of this application.

In another embodiment of this application, the foregoing control method for the uninterruptible power supply system is also applicable to a UPS system 2 shown in FIG. 11. The UPS system 2 shown in FIG. 11 may also operate in an ECO mode, that is, a bypass power supply branch 11 preferentially supplies power. When the bypass power supply branch 11 is abnormal, a inverter 121 supplies power. If a main rectifier 123 supplies power abnormally, a main energy storage battery 30 supplies power. Operating in the ECO mode helps improve power supply efficiency of the system.

The controller 50 in this application is a microcontroller unit (Microcontroller Unit, MCU). The controller 50 includes a memory and a processor. The memory stores a computer program, and the computer program may be executed by the processor to implement any step according to the foregoing control method for an uninterruptible power supply system.

The memory may include a high-speed RAM memory, and may further include a non-volatile memory NVM. Any processor mentioned above may be a general-purpose central processing unit (CPU), a microprocessor, an application-specific integrated circuit (application-specific integrated circuit, ASIC), or one or more integrated circuits configured to control program execution in the wireless communication method in the first aspect.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions in this application essentially or the part contributing to the conventional technology may be implemented in a form of a software product. The computer software product is stored in a readable storage medium, for example, a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods in embodiments of this application.

All or some of the foregoing embodiments may be implemented by software, hardware, firmware, or any combination thereof. When software is used to implement the embodiments, all or a part of the embodiments may be implemented in a form of a computer program product.

The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

A person of ordinary skill in the art should recognize that the foregoing implementations are merely used to describe the present invention, but are not intended to limit the present invention. Appropriate modifications and variations made to the foregoing embodiments shall fall within the protection scope of the present invention provided that they fall within the substantive scope of the present invention.

What is claimed is:

1. A control method for an uninterruptible power supply system, wherein the uninterruptible power supply system comprises a controller, a bypass power supply branch, an inverter power supply branch, and an energy storage battery, the bypass power supply branch and the inverter power supply branch are connected in parallel and then are connected to a load, the energy storage battery is connected to the inverter power supply branch, the bypass power supply branch comprises a first switch device and a second switch device that are connected in anti-parallel, the inverter power supply branch comprises an inverter and a direct current to direct current (DC/DC) converter that are connected in series, and the controller is separately connected to the inverter and the DC/DC converter; and the control method for the uninterruptible power supply system comprises:

when the bypass power supply branch supplies the power to the load, outputting a first drive signal to the first switch device and outputting a second drive signal to the second switch device; and controlling the first drive signal and the second drive signal to have a phase difference with an input voltage of the bypass power supply branch; or when a load current of the bypass power supply branch is less than a first threshold, outputting an inverter control signal to control the inverter power supply branch to charge the energy storage battery; or when a current of the inverter power supply branch flows back to an input end of the bypass power supply branch, turning off the first switch device and the second switch device via the inverter power supply branch, wherein the control method for the uninterruptible power supply system further comprises:

outputting an inverter control signal to the inverter power supply branch to control the inverter power supply branch to supply a power to the load;

detecting whether the current of the inverter power supply branch flows back to an input side of the bypass power supply branch, wherein detecting whether the current of the inverter power supply branch flows back to the input side of the bypass power supply branch comprises:

detecting whether the load current of the bypass power supply branch is greater than a second threshold, and keeping a duration for which the load current of the bypass power supply branch is greater than the second threshold be greater than a third threshold; and when the current of the inverter power supply branch flows back to the input side of the bypass power supply branch, controlling an output voltage of the inverter power supply branch, to turn off the first switch device and the second switch device.

2. The control method for the uninterruptible power supply system according to claim 1, wherein the controlling the first drive signal and the second drive signal to have the phase difference with an input voltage of the bypass power supply branch comprises: controlling phases of the first drive signal and the second drive signal to lead a phase of the input voltage of the bypass power supply branch.

3. The control method for the uninterruptible power supply system according to claim 2, wherein the phases of the first drive signal and the second drive signal lead the phase of the input voltage by 0° to 36°.

4. The control method for the uninterruptible power supply system according to claim 2, wherein the control method for the uninterruptible power supply system further comprises:

outputting an inverter control signal to control the inverter power supply branch to output a compensation current to compensate for a reactive current and a harmonic current in the load current of the bypass power supply branch, to increase a bypass input power factor.

5. The control method for the uninterruptible power supply system according to claim 2, wherein the phases of the first drive signal and the second drive signal are synchronous with or lead a phase of the load current.

6. The control method for the uninterruptible power supply system according to claim 1, wherein when the bypass power supply branch supplies the power to the load, and the load current of the bypass power supply branch is less than the first threshold, the control method for the uninterruptible power supply system further comprises:

outputting the first drive signal and the second drive signal to control the bypass power supply branch to be disconnected, and controlling the energy storage battery to be discharged, to supply a power to the load through the inverter power supply branch.

7. The control method for the uninterruptible power supply system according to claim 6, wherein when the load current of the bypass power supply branch is less than the first threshold, the uninterruptible power supply system is controlled to work alternately in a first working manner and a second working manner, and wherein:

the first working manner is: supplying, by the bypass power supply branch, a power to the load, and outputting the inverter control signal to control the inverter power supply branch to charge the energy storage battery; and the second working manner is: outputting the first drive signal and the second drive signal to control the bypass power supply branch to be disconnected, and controlling the energy storage battery to be discharged, to supply a power to the load through the inverter power supply branch.

8. The control method for the uninterruptible power supply system according to claim 6, wherein the first threshold is 5%.

9. The control method for the uninterruptible power supply system according to claim 1, wherein the second threshold is 20% of a rated input current value of the bypass power supply branch.

10. The control method for the uninterruptible power supply system according to claim 1, wherein the detecting whether the current of the inverter power supply branch flows back to an input side of the bypass power supply branch comprises:

detecting whether the current of the inverter power supply branch is greater than a fourth threshold, and keeping a duration for which the current of the inverter power supply branch is greater than the fourth threshold be greater than a fifth threshold.

11. The control method for the uninterruptible power supply system according to claim 10, wherein the fourth threshold is 150% of a rated current of an inverter.

12. The control method for the uninterruptible power supply system according to claim 1, wherein when the current of the inverter power supply branch flows back to the input side of the bypass power supply branch, and the input voltage is at a phase angle of 0° to 90° or 180° to 270°, the output voltage of the inverter power supply branch is controlled, to turn off the first switch device and the second switch device.

13. The control method for the uninterruptible power supply system according to claim 1, wherein:

the controlling an output voltage of the inverter power supply branch, to turn off the first switch device and the second switch device comprises:

controlling the inverter to output a voltage signal at a first level, to turn off the first switch device and the second switch device.

14. A controller for use in an uninterruptible power supply system, wherein: the uninterruptible power supply system comprises the controller, a bypass power supply branch, an inverter power supply branch, and an energy storage battery, the bypass power supply branch and the inverter power supply branch are connected in parallel and then are connected to a load, the energy storage battery is connected to the inverter power supply branch, the bypass power supply branch comprises a first switch device and a second switch device that are connected in anti-parallel, the inverter power supply branch comprises an inverter and a direct current to direct current (DC/DC) converter that are connected in series, and the controller is separately connected to the inverter and the DC/DC converter; and the controller comprises at least one processor and one or more memories coupled to the at least one processor, wherein the one or more memories store programming instructions for execution by the at least one processor to perform operations comprising:

when the bypass power supply branch supplies the power to the load, outputting a first drive signal to the first switch device and outputting a second drive signal to the second switch device; and controlling the first drive signal and the second drive signal to have a phase difference with an input voltage of the bypass power supply branch; or when a load current of the bypass power supply branch is less than a first threshold, outputting an inverter control signal to control the inverter power supply branch to charge the energy storage battery; or when a current of the inverter power supply branch flows back to an input end of the bypass power supply branch, turning off the first switch device and the second switch device via the inverter power supply branch, wherein the operations comprise:

outputting an inverter control signal to the inverter power supply branch to control the inverter power supply branch to supply a power to the load;

detecting whether the current of the inverter power supply branch flows back to an input side of the bypass power supply branch; and when the current of the inverter power supply branch flows back to the input side of the bypass power supply branch, controlling an output voltage of the inverter power supply branch, to turn off the first switch device and the second switch device, wherein when the current of the inverter power supply branch flows back to the input side of the bypass power supply branch, and the input voltage is at a phase angle of 0° to 90° or 180° to 270°, the output voltage of the inverter power supply branch is controlled, to turn off the first switch device and the second switch device.

15. The controller according to claim 14, wherein:

the controlling an output voltage of the inverter power supply branch, to turn off the first switch device and the second switch device comprises:

controlling the inverter to output a voltage signal at a first level, to turn off the first switch device and the second switch device.

16. An uninterruptible power supply system, wherein:

the uninterruptible power supply system comprises a controller, a bypass power supply branch, an inverter power supply branch, and an energy storage battery, a load, and a controller, the bypass power supply branch and the inverter power supply branch are connected in parallel and then are connected to the load, the energy storage battery is connected to the inverter power supply branch, the bypass power supply branch comprises a first switch device and a second switch device that are connected in anti-parallel, the bypass power supply branch and the inverter power supply branch are separately connected to the controller, the inverter power supply branch comprises an inverter and a direct current to direct current (DC/DC) converter that are connected in series, and the controller is separately connected to the inverter and the DC/DC converter; and the controller comprise at least one processor and one or more memories coupled to the at least one processor, wherein the one or more memories store programming instructions for execution by the at least one processor to perform operations comprising:

when the bypass power supply branch supplies the power to the load, outputting a first drive signal to the first switch device and outputting a second drive signal to the second switch device; and controlling the first drive signal and the second drive signal to have a phase difference with an input voltage of the bypass power supply branch; or when a load current of the bypass power supply branch is less than a first threshold, outputting an inverter control signal to control the inverter power supply branch to charge the energy storage battery; or when a current of the inverter power supply branch flows back to an input end of the bypass power supply branch, turning off the first switch device and the second switch device via the inverter power supply branch, wherein the operations comprise:

outputting an inverter control signal to the inverter power supply branch to control the inverter power supply branch to supply a power to the load;

detecting whether the current of the inverter power supply branch flows back to an input side of the bypass power supply branch; and when the current of the inverter power supply branch flows back to the input side of the bypass power supply branch, controlling an output voltage of the inverter power supply branch, to turn off the first switch device and the second switch device, comprising:

controlling the inverter to output a voltage signal at a first level, to turn off the first switch device and the second switch device.

17. The uninterruptible power supply system according to claim 16, wherein the bypass power supply branch comprises a current detection unit, and the current detection unit is configured to detect a current of the bypass power supply branch.

18. The uninterruptible power supply system according to claim 16, wherein the controlling the first drive signal and the second drive signal to have the phase difference with an input voltage of the bypass power supply branch comprises:

controlling phases of the first drive signal and the second drive signal to lead a phase of the input voltage of the bypass power supply branch.

19. The uninterruptible power supply system according to claim 18, wherein the phases of the first drive signal and the second drive signal lead the phase of the input voltage by 0° to 36°.

20. The uninterruptible power supply system according to claim 16, wherein when the current of the inverter power supply branch flows back to the input side of the bypass power supply branch, and the input voltage is at a phase angle of 0° to 90° or 180° to 270°, the output voltage of the inverter power supply branch is controlled, to turn off the first switch device and the second switch device.

* * * * *